United States Patent Office 3,500,638
Patented Mar. 17, 1970

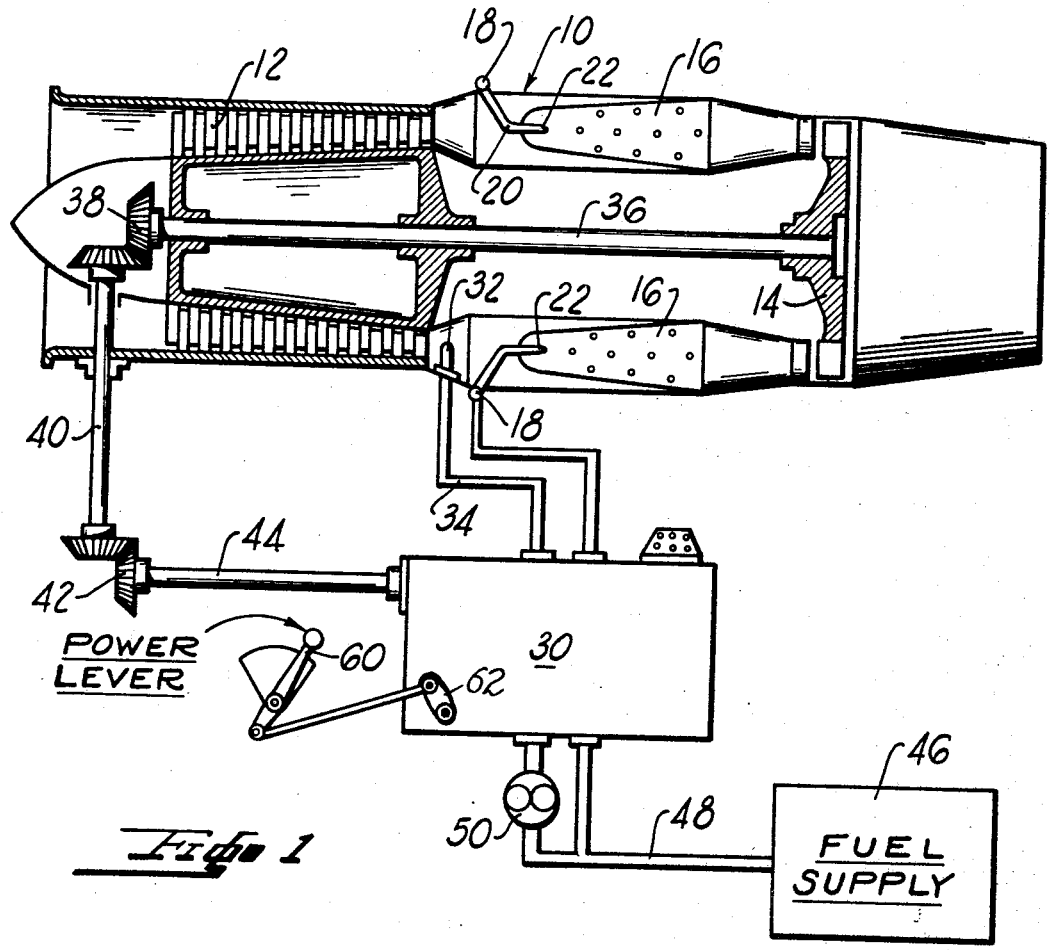

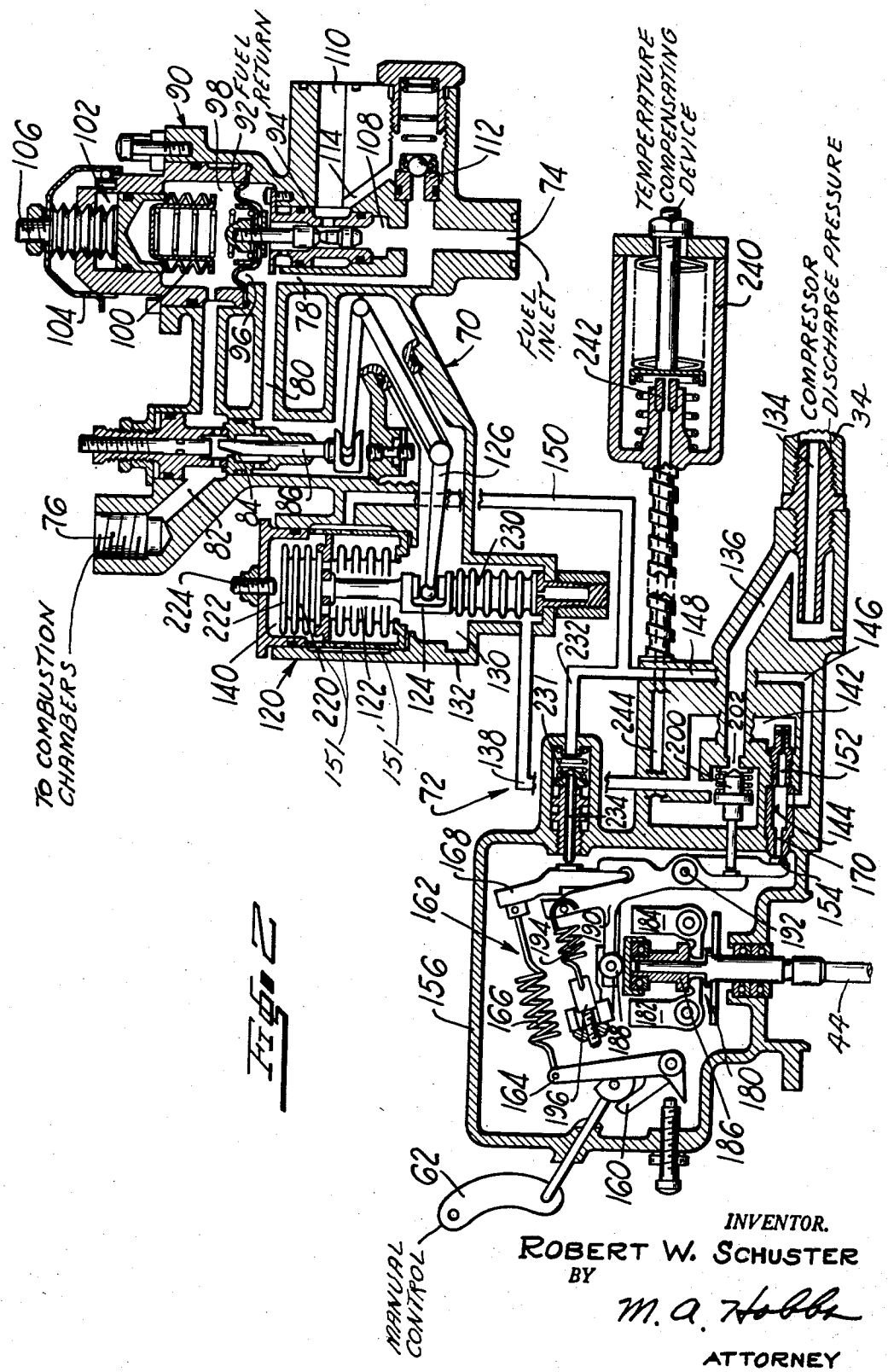

3,500,638
FUEL CONTROL FOR A GAS TURBINE ENGINE
Robert W. Schuster, 5215 Rowantree Place,
South Bend, Ind. 46619
Filed Dec. 21, 1967, Ser. No. 692,378
Int. Cl. F02c 9/04
U.S. Cl. 60—39.28                    12 Claims

ABSTRACT OF THE DISCLOSURE

A fuel control device for a gas turbine engine in which the fuel flow to the engine is regulated by a metering valve controlled by a pneumatic system having a governor bellows responsive to a compressor discharge pressure and to engine speed. A deceleration bellows mounted on and operating in conjunction with the governor bellows limits the engine deceleration to a rate at which flame-out will not occur. A valve is included in the pneumatic system to prevent the engine from overspeeding if the pneumatic system malfunctions because of contamination with foreign matter.

---

In pneumatic fuel controls for gas turbine engines, the compressor discharge pressure is used directly in conjunction with compressor speed to control a metering valve in the fuel regulating section of the control. The pneumatic controls have the advantages of low cost, simplicity and reliability, in that it is unnecessary to convert a compressor generated pneumatic pressure into an equivalent hydraulic fluid pressure and through a complex servo system, operate a metering valve for regulating the fuel flow to the engine burners. Further, these controls are readily responsive to manual control and engine operating conditions and, under most operating conditions, can effectively be regulated to obtain optimum engine performance. However, since these pneumatic controls utilize compressor air directly to operate the elements of the control, rather than employing a closed system such as in the hydraulic type systems, the air passages and elements may become contaminated with dust particles, moisture or other foreign matter entrained in the air from the compressor, and hence may malfunction and cause the engine to overspeed. Further, operation of the manual controls during deceleration without due care, may result in excessively rapid deceleration of the compressor and in the resultant flame-out of the engine. It is therefore one of the principal objects of the invention to provide a pneumatic fuel control in which contamination in the pneumatic section will not cause a critical malfunctioning of the engine and which will continue to regulate the fuel flow to the engine within proper operating limits until the adverse condition can be corrected.

Another object of the invention is to provide, in a pneumatic fuel control of the aforementioned type, a system which overrides the manual control means to limit the deceleration rate of the engine to that well below the rate at which flame-out will occur, and which does not interfere with the normal acceleration or steady state operation of the engine.

Still another object of the invention is to provide a relatively simple, highly reliable means for controlling engine deceleration to maintain a level of operation sufficiently high to prevent flame-out and for functioning as a safety control to prevent overspeeding of the engine during malfunctioning of the control under certain specific conditions.

Additional objects and advantages of the invention will become apparent from the following description and accompanying drawings, wherein:

FIGURE 1 is a diagrammatic view of a gas turbine engine and a control system therefor embodying the present invention; and FIGURE 2 is a diagrammatic cross sectional view of the fuel control system shown diagrammatically in FIGURE 1 and illustrating the construction and operation of the invention.

Referring more specifically to the drawings and to FIGURE 1 in particular, numeral 10 indicates generally a gas turbine engine having a compressor 12, a turbine 14, and 16 a plurality of combustion chambers or burners to which fuel is delivered by a manifold 18, fuel lines 20, and nozzles 22. Numeral 30 designates generally the main fuel control which is responsive to compressor outlet pressure sensed by a pickup 32 and transmitted through line 34, and by turbine speed transmitted through shaft 36, bevel gears 38, shaft 40, bevel gears 42 and shaft 44. The fuel is delivered from a fuel supply such as a tank 46 through a line 48 and pump 50. The main fuel control is manually controlled by lever 60 through linkage 62 connected to the control in the manner illustrated in FIGURE 2 of the drawings as will be more fully described hereinafter. The present fuel control system is capable of being used in different types of gas turbine engines, in addition to the one shown in the drawings, including the free turbine type engine.

The main fuel control consists essentially of a section containing the fuel circuit and a section containing the pneumatic circuit, indicated generally by numerals 70 and 72 respectively. The fuel section is connected to the fuel supply source by line 48 and pump 50 and inlet passage 74. Outlet passage 76 of the fuel section is connected to conduit 34, manifold 18, lines 20 and discharge nozzle 22 in each of the burners 16. The inlet and outlet passages are connected in the control by unmetered fuel passages 78 and 80 and metered fuel passage 82, with a metering orifice 84 being disposed between passages 80 and 82 and containing a contoured valve 86 operated in response to pressure variation in the air circuit of section 72. The pressure drop across metering orifice 84 is controlled by a pressure regulator generally indicated by numeral 90 and consisting of a diaphragm 92 and valve 94 operated by the diaphragm in response to the differential in pressures between chamber 96 and chamber 98. The pressure differential is adjusted by a spring 100 reacting between diaphragm 92 and an adjustment means 102, consisting of a movable cylinder 104 and an adjustment screw 106. As valve 94 is moved longitudinally in response to variations in pressure between chambers 96 and 98, fuel is returned to the source of supply from conduit 108 through conduit 110. A relief valve 112 of the ball check type is connected between passage 74 and return passage 110 by the valve and by-pass passage 114. In the foregoing system, the fuel is maintained at a substantially constant differential on opposite sides of metering orifice 84 and the position of metering valve 86 is varied to obtain the required fuel flow.

The fuel valve 86 is controlled by a pressure responsive device indicated generally by numeral 120 and consisting of a main control bellows 122 connected to valve 86 by a stem 124 and pivoted linkage 126 so that movement of the bellows downwardly as viewed in FIGURE 2 results in an increase in the opening of valve 86. Bellows 122 is disposed in a chamber 130 in housing 132 which is connected to compressor pressure through conduit 34 to inlet passage 134, which in turn is connected to the chamber by passages 136 and 138, thus subjected the internal walls of bellows 122 to compressor discharge pressure. The external side of the walls of bellows 122 is subjected to a control pressure consisting of a modified compressor discharge pressure, chamber 140 surrounding the bellows being connected to compressor discharge passage 136 by conduit 142, chamber 144, conduit 146, and conduits 148 and 150 and through holes 151 in sleeve 151' forming a portion of the side wall of chamber 140. A metering orifice 152 is disposed between passage 142 and chamber 144 and the pressure in chamber 144 is regulated by valve 154 controlled by the speed sensing and manual control devices contained in housing 156, more fully described hereafter.

Valve 154 is controlled primarily by the lever 60 through linkage 62, cam assembly 160 and linkage 162 consisting of lever 164, spring 166 and lever 168. When the speed lever is moved in the direction to increase the speed, the tension on spring 166 is increased, thereby tending to move lever 168 in the direction to seat valve 154 on the valve seat at orifice 170. The speed governor 180, which is driven from the turbine through shaft 44, causes weights 182 and 184 to move outwardly in response to the speed thereof and to shift sleeve 186 upwardly against roller 188. The roller is supported on a lever 190 which is pivoted on a pin 192 and held in a position to resist the outward movement of the two weights, by spring 166 and spring 194, the latter spring reacting between the upper end of lever 190 and an anchor means 196 supported by lever 168.

As the weights move out in response to an increase in turbine speed, lever 190 is first moved angularly in a clockwise direction, engaging lever 168 which in turn operates control valve 154 and an enrichment valve 200 controlling orifice 202. As lever 190 is retracted from the stem of valve 200, the orifice is opened wide so that there is no significant pressure drop across the orifice. As lever 190 moves further in the clockwise direction in response to the outward movement of the centrifugal weights 182 and 184, spring 194 yields sufficiently to permit the upper end of the lever to engage lever 168 and move the lever in the direction to open valve 154. As valve 154 is opened, air is bled from chamber 144, thereby reducing the pressure in conduits 148 and 150 and chamber 140. This causes bellows 122 to expand and move stem 124 upwardly and, through linkage 126, move valve 86 toward closed position, thus establishing a steady state running condition for the particular throttle position as determined by the operation of the lever 60.

When the lever 60 is moved in the direction to decelerate, lever 168 tends to move in the clockwise direction, further opening valve 154 and causing a further decrease in pressure in chamber 144, passages 148 and 150, and hence a further decrease in pressure in chamber 140 on the external side of the bellows. This causes the stem 124 to move upwardly, thereby moving linkage 126 in the direction to close fuel metering valve 86.

Under the foregoing deceleration conditions, the bellows tends to move rapidly upwardly in chamber 130, carrying stem 124 in the direction to close the valve possibly sufficiently to cause flame-out. In order to eliminate the possibility of flame-out as a result of excessively fast deceleration, the present pneumatic system includes a secondary bellows 220 mounted on the upper end of bellows 122 and movable freely therewith until the upper end 222 engages screw 224. The differential in pressure between the inside and the outside of bellows 122 is thus nullified so that the spring rate of deceleration bellows 220 is effectively utilized in controlling the closing of valve 86. Since the governor bellows is now not responsive to the differential in pressure across the bellows, the spring rate of the deceleration bellows provides a deceleration schedule at a reduced rate proportional to the compressor discharge pressure. After the deceleration bellows seats on stop 224, the governor bellows 122 and the deceleration bellows 220 become nonresponsive to change in the differential in pressure across the bellows, and an evacuated bellows 230 as modified by the spring effect of the deceleration bellows 220 after it has seated on stop 224, now controls the metering valve 86 in response to changes in compressor discharge pressure, so that the closing of the metering valve is proportional to compressor discharge pressure modified by the spring rate of the deceleration bellows.

If the deceleration were from one level of operation to another lower level of operation, a steady state condition is again re-established when the lower level is reached and valve 154 is again moved toward closed position, causing a decrease in the differential across the bellows and retraction of the deceleration bellows from stop 224 so that the governor bellows 122 is again in full control of metering valve 86.

One of the advantages of the present invention is a relatively simple overspeed control system which prevents the engine from reaching an excessive speed in the event contamination blocks or restricts some of the air passages between orifice 152 and chamber 140. For example, if a small particle of foreign matter blocked or restricted the flow of air through valve orifice 170, the pressure in chamber 140 would increase relative to the pressure in chamber 130 and might increase to the extent of causing excessive speed of the engine. Under this condition an overspeed means, consisting of a valve 231 connected by a conduit 232 to conduit 148, is opened by contact of lever 168 with valve stem 234 when governor 180 senses the excess engine speed, thus reducing the pressure in conduit 150 and chamber 140, and thereby causing the bellows 122 to expand and to move metering valve 86 toward closed position for reducing engine speed. After the contamination has been removed from valve orifice 170, the system returns to its original normal operating condition.

The control includes a temperature compensating device 240 which senses the temperature of the air at the compressor intake. Device 240 contains a bleed valve 242 connected to passage 142 by passage 244, and causes a reduction in pressure in chamber 130 when the ambient air temperature decreases, thus causing a movement of valve 86 in the opening direction to increase the fuel flow to the burners. The reverse operation takes place when the temperature of the ambient air increases.

In the operation of the present fuel control, level 62 is rotated in the clockwise direction as seen in FIGURE 2 to accelerate the engine, thus moving lever 168 in the direction to restrict valve orifice 170. This results in an increase in pressure in chamber 130 and a decrease in the differential between chambers 130 and 140 across the bellows. The increased compressor pressure transmitted to chamber 130 contracts bellows 230, moving valve 86 toward open position to increase the fuel flow to the engine. As the engine accelerates, the flyweights of governor 180 move lever 168 outwardly and move valve 154 toward open position. With the increased opening of valve 154, the pressure drop across orifice 152 is transmitted to the two chambers 130 and 140, resulting in an expansion of governor bellows 122, thereby moving stem 124 and linkage 126 in the direction partially closing valve 86. This operation continues until a steady state condition is reached between the operation of governor 180 and governor bellows 122. When the engine is to be decelerated, lever 62 is moved in the counterclockwise direction, causing lever 168 to move in the direction to further open valve 154, thus resulting in a greater differential between the pressures in chambers 130 and 140, and thereby causing bellows 122 and 220 to expand and move stem 124 and linkage 126 in the direction to close metering valve 86. The end of bellows 220 seats on stop 224, thus rendering bellows 122 ineffective as a pressure responsive means for controlling valve 86. Bellows 220 then becomes a spring responsive means cooperating with the movement of bellows 230 in response to a decrease in compressor discharge pressure. During maximum deceleration, when bellows 220 seats on stop 224, the rate of bellows 220 becomes additive to the rate of bellows 230, and the rate of travel of valve 86 becomes a function of rates of bellows 220 and 230 and variations in pressure in chamber 140 no longer effect the travel of the valve. Deceleration of the engine is thus controlled by bellows 230 as modified by the spring rates of bellows 122 and 220. As the compressor speed decreases, the discharge pressure decreases in chamber 130 and the differential across the bellows decreases, such that the control bellows 122 again resumes primary control of metering valve 86.

While only one embodiment of the present fuel control device for a gas turbine engine has been described herein in detail, various changes and modifications may be made without departing from the scope of the invention.

I claim:

1. A fuel control device for a gas turbine engine having a compressor, comprising a main fuel passage, a metering valve in said passage, a pneumatic control system for said valve including a chamber, a governor bellows in said chamber, a linkage connecting said bellows to said valve, an evacuated bellows disposed in said chamber and connected to said linkage, a passage connecting said bellows to the compressor outlet for sensing discharge pressure, a deceleration bellows connected to said governor bellows and subjected on one side to said discharge pressure, a passage connecting said compressor discharge pressure passage with the other side of said governor and deceleration bellows and having a restriction therein, a bleed valve in said last mentioned passage posterior to said restriction, centrifugal governor means responsive to turbine speed for controlling said bleed valve, a manually operated linkage for regulating said bleed valve, and an abutment for said deceleration bellows rendering the differential in pressure across said bellows ineffective to control said metering valve during maximum deceleration of the engine and shifting the control thereof to said evacuated bellows and to the spring component of said deceleration bellows for limiting the maximum rate of travel of the metering valve during deceleration of the engine.

2. A fuel control device as defined in claim 1 in which said governor bellows and said deceleration bellows are in axial alignment with one another, and said linkage for said metering valve is connected to said governor bellows at the juncture of said two bellows.

3. A fuel control device as defined in claim 2 in which said governor bellows and deceleration bellows are of substantially the same diameter and communicate internally directly with one another.

4. A fuel control device as defined in claim 3 in which said linkage includes a stem movable longitudinally with said governor bellows and said evacuated bellows is connected to said stem for moving said stem and linkage in response to variations in compressor pressure.

5. A fuel control device as defined in claim 4 in which said deceleration bellows contains a disc-shaped end plate engaging said abutment under certain operating conditions during deceleration of the engine.

6. A fuel control device as defined in claim 5 in which said abutment is adjustable to vary the point at which said deceleration bellows controls said fuel valve.

7. A fuel control device as defined in claim 1 in which a second bleed valve is connected to the passage connecting the bellows to the compressor discharge pressure for limiting the speed of said engine.

8. A fuel control device as defined in claim 6 in which a second bleed valve controlled by the centrifugal governor is connected to the passage connecting the bellows to the compressor discharge pressure for limiting the speed of said engine.

9. A fuel control device as defined in claim 1 in which the passage connecting the bellows to the compressor discharge pressure includes an enrichment valve controlled by said centrifugal governor.

10. A fuel control device as defined in claim 8 in which the passage connecting the bellows to the compressor discharge pressure includes fuel enrichment means consisting of a restriction and a valve therein controlled by said centrifugal governor and manual control means.

11. A fuel control device as defined in claim 1 in which a bleed valve is connected to the passage connecting the bellows to the compressor discharge pressure, and a means responsive to ambient air temperature controlling said valve.

12. A fuel control device as defined in claim 10 in which a bleed valve is connected to the passage connecting the bellows to the compressor discharge pressure, and a means in said passage responsive to ambient air temperature controlling said valve.

References Cited

UNITED STATES PATENTS 3,438,199   4/1969   McGinnis _____ 60—39.28

MARK M. NEWMAN, Primary Examiner

UNITED STATES PATENT OFFICE

CERTIFICATE OF CORRECTION

Patent No. 3,500,638                          March 17, 1970

Robert W. Schuster

It is certified that error appears in the above identified patent and that said Letters Patent are hereby corrected as shown below:

In the heading to the printed specification, lines 3 and 4, "Robert W. Schuster, 5215 Rowantree Place, South Bend, Ind. 46619" should read -- Robert W. Schuster, South Bend, Ind., assignor to The Bendix Corporation, a corporation of Delaware --.

Signed and sealed this 8th day of December 1970.

(SEAL)
Attest:

Edward M. Fletcher, Jr.                      WILLIAM E. SCHUYLER, JR.
Attesting Officer                              Commissioner of Patents